(12) United States Patent
Nagashima et al.

(10) Patent No.: US 12,105,204 B2
(45) Date of Patent: Oct. 1, 2024

(54) SENSOR SYSTEM

(71) Applicant: KOITO MANUFACTURING CO., LTD., Tokyo (JP)

(72) Inventors: Toru Nagashima, Shizuoka (JP); Shuki Yamamoto, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 925 days.

(21) Appl. No.: 17/262,537

(22) PCT Filed: Jul. 18, 2019

(86) PCT No.: PCT/JP2019/028292
§ 371 (c)(1),
(2) Date: Jan. 22, 2021

(87) PCT Pub. No.: WO2020/022185
PCT Pub. Date: Jan. 30, 2020

(65) Prior Publication Data
US 2021/0341622 A1    Nov. 4, 2021

(30) Foreign Application Priority Data
Jul. 25, 2018  (JP) .................................. 2018-139517

(51) Int. Cl.
*G01S 17/931*   (2020.01)
*G01C 19/00*    (2013.01)
(Continued)

(52) U.S. Cl.
CPC ............ *G01S 17/931* (2020.01); *G01C 19/00* (2013.01); *G01P 15/00* (2013.01); *G01S 7/4815* (2013.01); *G01S 7/4817* (2013.01); *G08G 1/16* (2013.01)

(58) Field of Classification Search
CPC .... G01S 17/931; G01S 7/4815; G01S 7/4817; G01C 19/00; G01P 15/00; G08G 1/16
See application file for complete search history.

(56) References Cited

U.S. PATENT DOCUMENTS 5,652,655 A     7/1997   Uno et al.
2007/0076186 A1 4/2007   Miyazaki et al.
(Continued)

FOREIGN PATENT DOCUMENTS

CN    101246000 A    8/2008
CN    103983195 A    8/2014
(Continued)

OTHER PUBLICATIONS

International Search Report dated Sep. 24, 2019 issued by the International Searching Authority in counterpart International Application No. PCT/JP2019/028292 (PCT/ISA/210).
(Continued)

*Primary Examiner* — Luke D Ratcliffe
(74) *Attorney, Agent, or Firm* — Sughrue Mion, PLLC

(57) ABSTRACT

A first light emitting element emits first detecting light toward the outside of a vehicle. A second light emitting element emits second detecting light toward the outside of the vehicle. A first light receiving element outputs a first signal corresponding to an amount of incident light. A second light receiving element outputs a second signal corresponding to an amount of incident light. A processor acquires first data corresponding to the first signal and second data corresponding to the second signal, and exchanges the first data and the second data in a case where the first data is based on the second detecting light and the second data is based on the first detecting light.

4 Claims, 7 Drawing Sheets

(51) Int. Cl.
*G01P 15/00* (2006.01)
*G01S 7/481* (2006.01)
*G08G 1/16* (2006.01)

(56) References Cited

U.S. PATENT DOCUMENTS

| | | |
|---|---|---|
| 2014/0009747 A1 | 1/2014 | Suzuki et al. |
| 2015/0316650 A1 | 11/2015 | Imai |
| 2016/0164258 A1 | 6/2016 | Weichmann et al. |
| 2016/0222714 A1 | 8/2016 | Rai et al. |
| 2017/0199272 A1 | 7/2017 | Takaoka et al. |
| 2017/0254697 A1 | 9/2017 | Furukawa |
| 2018/0284256 A1 | 10/2018 | Sutou et al. |
| 2018/0329064 A1* | 11/2018 | Mellot .................... G01S 17/42 |
| 2018/0348369 A1 | 12/2018 | Ohki |
| 2019/0011567 A1* | 1/2019 | Pacala .................... G01S 7/4815 |
| 2019/0250263 A1 | 8/2019 | Watanabe et al. |

FOREIGN PATENT DOCUMENTS

| | | |
|---|---|---|
| CN | 105579870 A | 5/2016 |
| CN | 106471335 A | 3/2017 |
| CN | 107152913 A | 9/2017 |
| CN | 107850668 A | 3/2018 |
| CN | 108139476 A | 6/2018 |
| CN | 108139477 A | 6/2018 |
| JP | 8-248133 A | 9/1996 |
| JP | 9-96525 A | 4/1997 |
| JP | 2697307 B2 | 9/1997 |
| JP | 10-209838 A | 8/1998 |
| JP | 2007-101342 A | 4/2007 |
| JP | 2008-185563 A | 8/2008 |
| JP | 2010-185769 A | 8/2010 |
| JP | 2013-113698 A | 6/2013 |
| JP | 2014-29317 A | 2/2014 |
| JP | 2016-525802 A | 8/2016 |
| JP | 2017-166846 A | 9/2017 |
| WO | 2014/038527 A1 | 3/2014 |

OTHER PUBLICATIONS

International Written Opinion dated Sep. 24, 2019 issued by the International Searching Authority in counterpart International Application No. PCT/JP2019/028292 (PCT/ISA/237).
Communication dated Feb. 21, 2024 issued by the China Intellectual Property Administration in Chinese Application No. 201980049488.8.

* cited by examiner

SENSOR SYSTEM

CROSS-REFERENCE TO RELATED APPLICATIONS

This application is a National Stage of International Application No. PCT/JP2019/028292 filed Jul. 18, 2019, claiming priority based on Japanese Patent Application No. 2018-139517, filed Jul. 25, 2018, the contents of all of which are incorporated herein by reference in their entirety.

FIELD

The presently disclosed subject matter relates to a sensor system adapted to be installed in a vehicle.

BACKGROUND

In order to realize the driving support technology of the vehicle, a sensor for detecting information in an outside area of the vehicle shall be mounted on the vehicle body. Examples of such sensors include LiDAR (Light Detection and Ranging) sensors and cameras (see, e.g., Patent Document 1).

CITATION LIST

Patent Document

Patent Document 1: Japanese Patent Publication No. 2010-185769 A

SUMMARY

Technical Problem

In the sensor system as described above, it is demanded to suppress degradation in the information acquisition capability caused by vibration or the like of the vehicle.

Solution to Problem

In order to meet the demand described above, a first illustrative aspect of the presently disclosed subject matter provides a sensor system adapted to be installed in a vehicle, comprising:
a first light emitting element configured to emit first detecting light toward the outside of the vehicle;
a second light emitting element configured to emit second detecting light toward the outside of the vehicle;
a first light receiving element configured to output a first signal corresponding to an amount of incident light;
a second light receiving element configured to output a second signal corresponding to an amount of incident light; and
a processor configured to acquire first data corresponding to the first signal and second data corresponding to the second signal, and configured to exchange the first data and the second data in a case where the first data is based on the second detecting light and the second data is based on the first detecting light.

According to such a configuration, even when reflected light from an external object is not normally incident on the light receiving element due to vibration or the like of the vehicle, it is possible to output data corresponding to a normal light receiving state. Accordingly, in a sensor system including at least two sets of light emitting elements and light receiving elements, it is possible to suppress degradation in information processing capability caused by vibration or the like of the vehicle.

The sensor system according to the first illustrative aspect may be configured to comprise:
a third light emitting element disposed between the first light emitting element and the second light emitting element, and configured to emit third detecting light toward the outside of the vehicle; and
a third light receiving element disposed between the first light receiving element and the second light receiving element, and configured to output a third signal corresponding to an amount of incident light,
wherein the processor is configured to acquire third data corresponding to the third signal, and configured to create average data by subjecting the first data and the second data to averaging processing to exchange the third data with the average data in a case where both of the first data and the third data are based on the first detecting light or the third detecting light, or a case where both of the second data and the third data are based on the second detecting light or the third detecting light.

According to such a configuration, even when reflected light from an external object is not normally incident on the light receiving element due to vibration or the like of the vehicle, it is possible to output data similar to the data that shall be obtained in the normal light receiving state. Accordingly, in a sensor system including at least three sets of light emitting elements and light receiving elements, it is possible to suppress degradation in information processing capability caused by vibration or the like of the vehicle.

The sensor system according to the first illustrative aspect may be configured such that the first light receiving element and the second light receiving element are arranged in a direction corresponding to an up-down direction of the vehicle.

The vibration of the vehicle is dominated by a component in the up-down direction. Accordingly, the abnormal light reception described above is likely to occur between the first light receiving element and the second light receiving element arranged in the direction corresponding to the up-down direction of the vehicle. However, since the processor can perform the above-described exchange or averaging processing of the first data and the second data, it is possible to effectively correct the influence of the inversion phenomenon in the light reception caused by the vibration of the vehicle.

The sensor system according to the first illustrative aspect may be configured such that the first light emitting element, the second light emitting element, the first light receiving element, and the second light receiving element constitute a part of at least one of a LiDAR sensor unit, a TOF camera unit, and a millimeter wave radar unit.

In order to meet the demand described above, a second illustrative aspect of the presently disclosed subject matter provides a sensor system adapted to be installed in a vehicle, comprising:
a sensor unit configured to detect information in an outside area of the vehicle;
a displacement sensor configured to detect displacement of the sensor unit in a direction along at least an up-down direction of the vehicle; and
a processor configured to correct data corresponding to the information on the basis of data corresponding to the displacement.

According to the configuration as described above, it is possible to suppress the influence of the displacement of the sensor unit caused by the vibration or the like of the vehicle on the information detection. Accordingly, it is possible to suppress degradation in the information acquisition capability of the sensor system caused by vibration or the like of the vehicle.

The sensor system according to the second illustrative aspect may be configured such that the sensor unit is at least one of a LiDAR sensor unit, a TOF camera unit, and a millimeter wave radar unit.

As used herein, the term "sensor unit" means a constituent unit of a component that can be distributed by itself as a single unit while providing a desired information detecting function.

As used herein, the term "driving support" means control processing that at least partially performs at least one of driving operation (steering operation, acceleration, deceleration), monitoring of a driving environment, and backup of driving operation. That is, it includes not only the partial driving support such as braking function for collision avoidance and assisting function for lane-keeping, but also a full self-driving operation.

DESCRIPTION OF EMBODIMENTS

Examples of embodiments will be described below in detail with reference to the accompanying drawings. In each of the drawings used in the following description, the scale is appropriately changed in order to make each member have a recognizable size.

Figure 1:
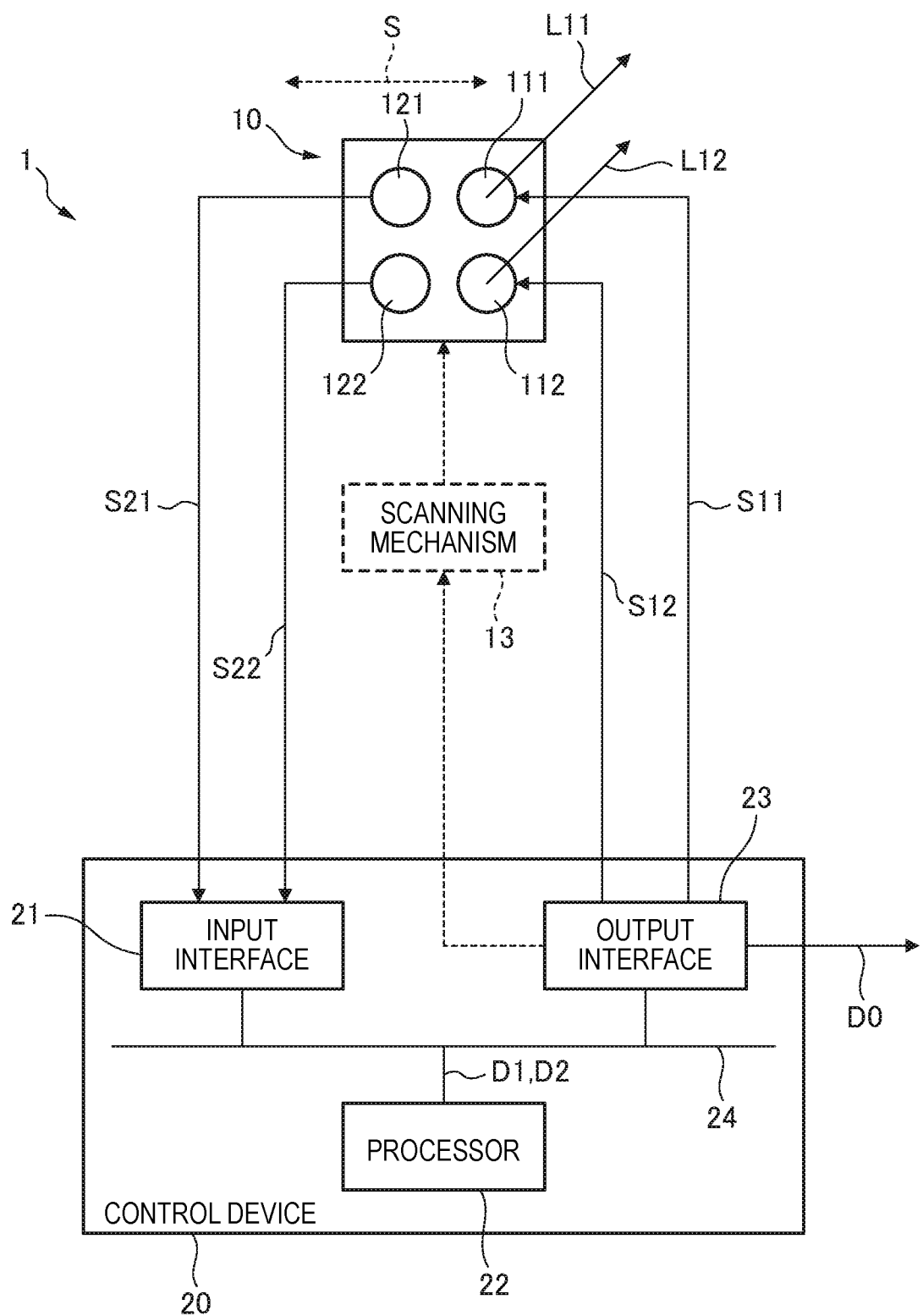
FIG. 1 illustrates a functional configuration of a sensor system according to a first embodiment.

FIG. 1 illustrates a configuration of a sensor system 1 according to a first embodiment. The sensor system 1 is installed in a vehicle.

The sensor system 1 includes a LiDAR sensor unit 10. The LiDAR sensor unit 10 includes a first light emitting element 111, a second light emitting element 112, a first light receiving element 121, and a second light receiving element 122.

The first light emitting element 111 is configured to emit first detecting light L11 toward the outside of the vehicle. The first detecting light L11 is non-visible light. As the non-visible light, for example, infrared light having a wavelength of 905 nm can be used. As the first light emitting element 111, a semiconductor light emitting element such as a laser diode or a light emitting diode can be used.

The second light emitting element 112 is configured to emit second detecting light L12 toward the outside of the vehicle. The second detecting light L12 is non-visible light. As the non-visible light, for example, infrared light having a wavelength of 905 nm can be used. As the second light emitting element 112, a semiconductor light emitting element such as a laser diode or a light emitting diode can be used.

The first light receiving element 121 is configured to output a light receiving signal S21 corresponding to the amount of incident light. The first light receiving signal S21 is an example of the first signal. The first light receiving element 121 has sensitivity to at least the wavelength of the first detecting light L11. As the first light receiving element 121, a photodiode, a phototransistor, a photo resistor, or the like can be used.

The second light receiving element 122 is configured to output a light receiving signal S22 corresponding to the amount of incident light. The second light receiving signal S22 is an example of the second signal. The second light receiving element 122 has sensitivity to at least the wavelength of the second detecting light L12. As the second light receiving element 122, a photodiode, a phototransistor, a photo resistor, or the like can be used.

The sensor system 1 includes a control device 20. The control device 20 includes an input interface 21, a processor 22, an output interface 23, and a communication bus 24. The input interface 21, the processor 22, and the output interface 23 can exchange signals and data via the communication bus 24.

The first light receiving signal S21 outputted from the first light receiving element 121 and the second light receiving signal S22 outputted from the second light receiving element 122 are inputted to the input interface 21.

The processor 22 acquires the first data D1 and the second data D2 respectively corresponding to the first light receiving signal S21 and the second light receiving signal S22 that are inputted to the input interface 21. The first data D1 and the second data D2 are placed in a state that can be subjected to information processing performed in the processor 22 (described later). That is, the input interface 21 has an appropriate circuit configuration for converting the first light receiving signal S21 and the second light receiving signal S22 into the first data D1 and the second data D2, respectively.

The processor 22 inputs the first control signal S11 to the first light emitting element 111 via the output interface 23, thereby controlling the light emitting operation of the first light emitting element 111. Specifically, the amount of light, the light emission timing, the light emission cycle, and the like of the first detecting light L11 are controlled. By appropriately performing adjustment of the light emitting timing or light modulation, identification information can be assigned to the first detecting light L11.

Similarly, the processor 22 inputs the second control signal S12 to the second light emitting element 112 via the output interface 23, thereby controlling the light emitting operation of the second light emitting element 112. Specifically, the amount of light, the light emission timing, the light emission cycle, and the like of the second detecting light L12 are controlled. By appropriately performing adjustment of the light emitting timing or light modulation, identification information can be assigned to the second detecting light L12.

Figure 2A:
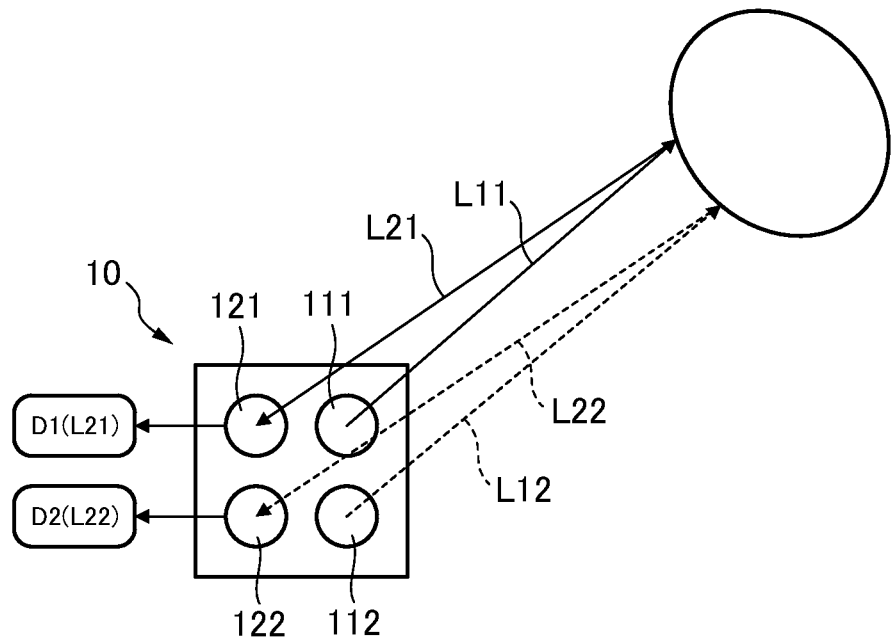
FIG. 2A is a diagram for explaining how the sensor system of FIG. 1 operates.

As illustrated in FIG. 2A, the first detecting light L11 emitted from the first light emitting element 111 is reflected by an object that situates outside the vehicle, so that first reflected light L21 is generated. The identification information assigned to the first detecting light L11 is reflected to the first reflected light L21. The first reflected light L21 is incident on the first light receiving element 121. The first light receiving element 121 outputs a first light receiving signal S21 corresponding to the amount of the first reflected light L21. As a result, the first data D1 associated with the first reflected light L21 is obtained. The identification information assigned to the first detecting light L11 is also reflected to the first data D1.

Similarly, the second detecting light L12 emitted from the second light emitting element 112 is reflected by an object that situates outside the vehicle, so that second reflected light L22 is generated. The identification information assigned to the second detecting light L12 is reflected to the second reflected light L22. The second reflected light L22 is incident on the second light receiving element 122. The second light receiving element 122 outputs a second light receiving signal S22 corresponding to the amount of the second reflected light L22. As a result, the second data D2 associated with the second reflected light L22 is obtained. The identification information assigned to the second detecting light L12 is also reflected to the second data D2.

The processor 22 can obtain the distance to the object associated with the first reflected light L21 based on the time period from the time when the first detecting light L11 is emitted to the time when the first reflected light L21 is detected. Additionally or alternatively, the processor 22 can obtain information as to an attribute such as the material of the object associated with the first reflected light L21 based on the difference in waveforms of the first detecting light L11 and the first reflected light L21.

Similarly, the processor 22 can obtain the distance to the object associated with the second reflected light L22 based on the time period from the time when the second detecting light L12 is emitted to the time when the second reflected light L22 is detected. Additionally or alternatively, the processor 22 can obtain information as to an attribute such as the material of the object associated with the second reflected light L22 based on the difference in waveforms of the second detecting light L12 and the second reflected light L22.

As illustrated in FIG. 1, the LiDAR sensor unit 10 may include a scanning mechanism 13. The scanning mechanism 13 changes the light emitting directions of the first detecting light L11 and the second detecting light L12 along a direction S intersecting the arrangement direction of the first light emitting element 111 and the second light emitting element 112. The processor 22 can control the operation of the scanning mechanism 13 via the output interface 23.

N sets of first data D1 and second data D2 are acquired by repeating the light emitting operation and the light receiving operation N times during a single scanning. For example, by acquiring the distance information to the object described above for the N sets of data, it is possible to acquire information as to the shape of the object associated with the first reflected light L21 and the second reflected light L22.

The processor 22 is configured to output data DO including the information of the object that situates outside the vehicle acquired as described above via the output interface 23 to an external entity. The data DO is used for additional information processing performed by another processor.

Figure 3:
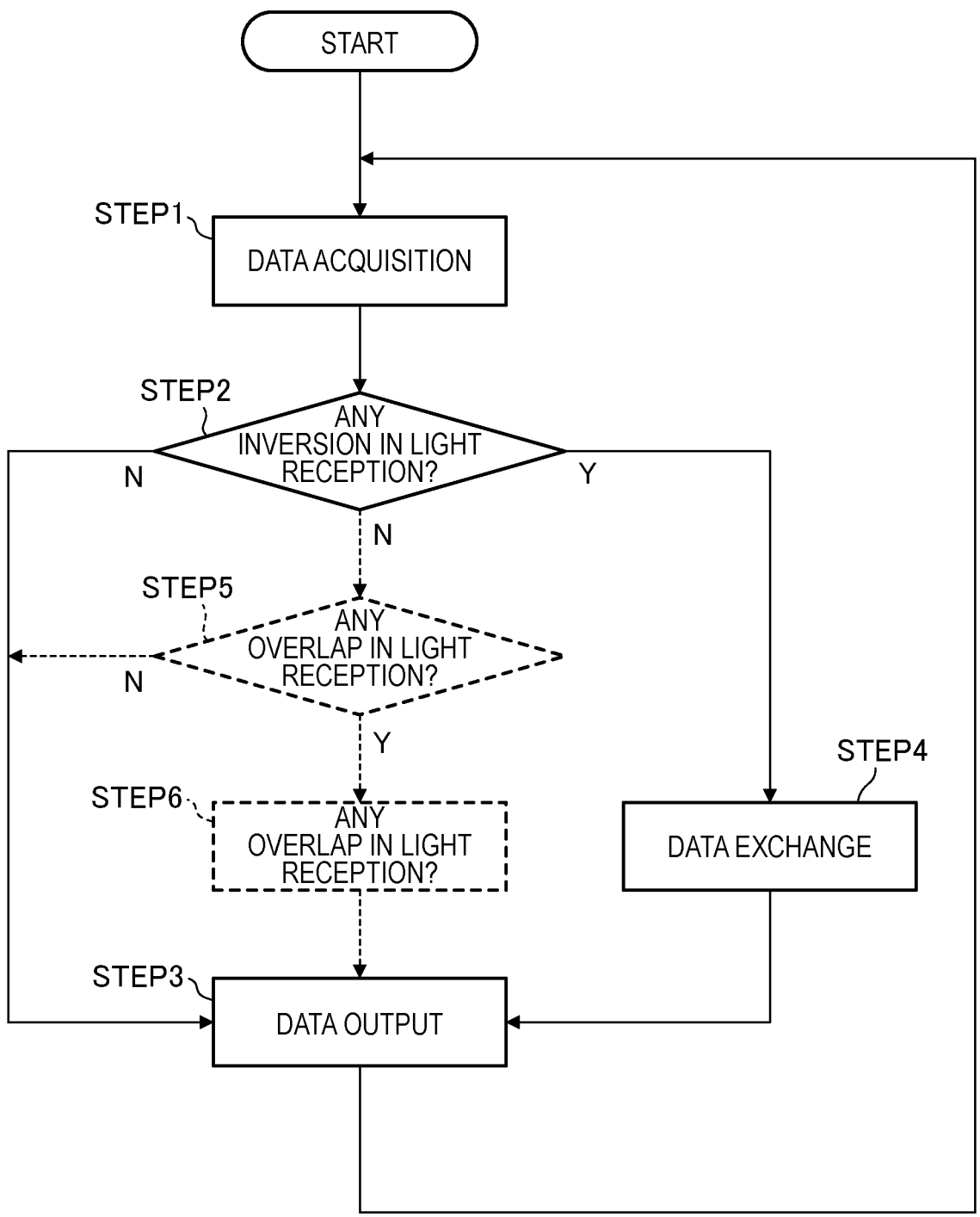
FIG. 3 illustrates an operation flow of the sensor system of FIG. 1.

FIG. 3 illustrates a flow of processing performed by the processor 22. First, the processor 22 acquires the first data D1 and the second data D2 as described above (STEP1).

Subsequently, the processor 22 determines whether or not there is an inversion phenomenon of light reception (STEP2). Specifically, it is determined whether the first data D1 is based on the first detecting light L11. Similarly, it is determined whether the second data D2 is based on the second detecting light L12.

As described with reference to FIG. 2A, in the normal state, the first reflected light L21 generated by the first detecting light L11 is incident on the first light receiving element 121, and the second reflected light L22 generated by the second detecting light L12 is incident on the second light receiving element 122. Accordingly, if the first data D1 is created on the basis of the first reflected light L21, the identification information assigned to the first detecting light L11 is reflected in the first data D1. If the second data D2 is created on the basis of the second reflected light L22, the identification information assigned to the second detecting light L12 is reflected in the second data D2. The processor 22 makes the above-described determination through the detection of the identification information.

When it is determined that the first data D1 is based on the first detecting light L11 and the second data D2 is based on the second detecting light L12 (N in STEP2 of FIG. 3), the first data D1 and the second data D2 are outputted as they are as illustrated in FIG. 2A (STEP3 of FIG. 3). Thereafter, the processing returns to STEP1.

Figure 2B:
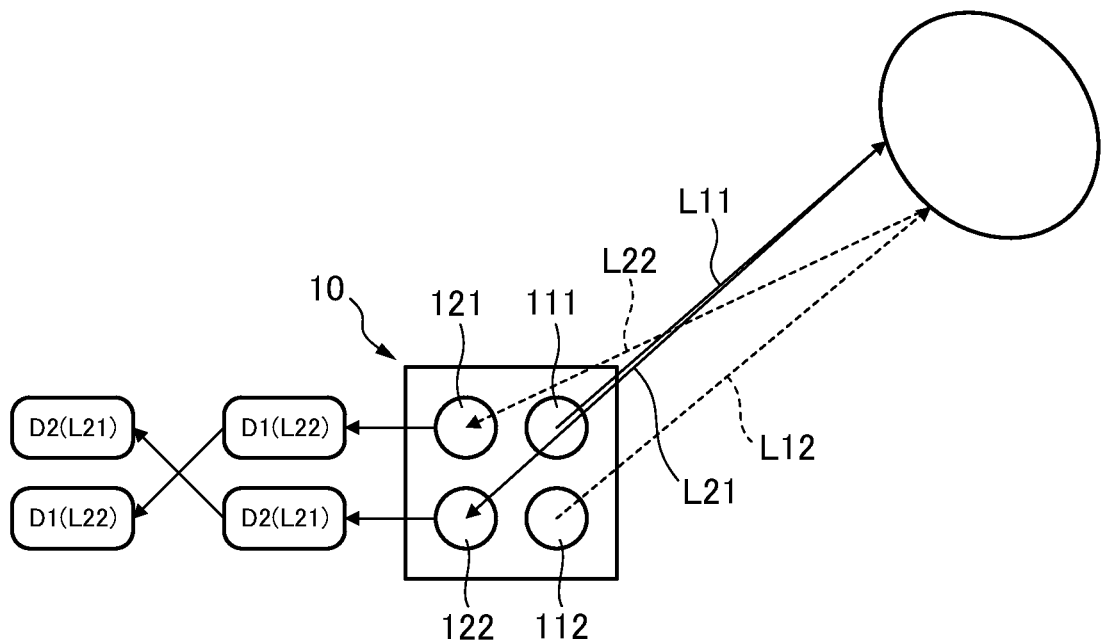
FIG. 2B is a diagram for explaining how the sensor system of FIG. 1 operates.

As illustrated in FIG. 2B, when the LiDAR sensor unit 10 is displaced due to vibration or the like of the vehicle, the first reflected light L21 may happen to be incident on the second light receiving element 122 and the second reflected light L22 may happen to be incident on the first light receiving element 121. In this case, the identification information assigned to the second detecting light L12 is reflected in the first data D1 created on the basis of the first light receiving signal S21 outputted from the first light receiving element 121. On the other hand, the identification information assigned to the first detecting light L11 is reflected in the second data D2 created on the basis of the second light receiving signal S22 outputted from the second light receiving element 122. When the first data D1 and the second data D2 are outputted as they are, the accuracy of the information as for the object in an outside area of the vehicle that is to be obtained by the subsequent processing is reduced.

Accordingly, when it is determined that the first data D1 is based on the second detecting light L12 and the second data D2 is based on the second detecting light L12 (Y in STEP2 of FIG. 3), the processor 22 performs processing for exchanging the first data D1 and the second data D2, as illustrated in FIG. 2B (STEP4 of FIG. 3). Subsequently, the first data D1 and the second data D2 that have been exchanged are outputted (STEP3 of FIG. 3). For example, when the first data D1 and the second data D2 are serially outputted, the order of outputting the first data D1 and the second data D2 is exchanged. For example, when the first data D1 and the second data D2 are outputted in parallel, the addresses of the output ports assigned to both data are exchanged.

When N light emitting operations and light receiving operations are performed during a single scanning while the light emitting directions of the first detecting light L11 and the second detecting light L12 are changed by the scanning mechanism 13, a data set of 2 rows×N columns (a set including N first data D1 and N second data D2) is acquired. In this case, the exchange of the first data D1 and the second data D2 may be performed in units of rows. That is, the entire N pieces of first data D1 and the entire N pieces of second data D2 can be exchanged with each other.

According to such a configuration, even when reflected light from an object is not normally incident on the light receiving element due to vibration or the like of the vehicle, it is possible to output data corresponding to a normal light receiving state. In a sensor system including at least two sets of light emitting elements and light receiving elements, it is possible to suppress degradation in information processing capability caused by vibration or the like of the vehicle.

In the present embodiment, the first light receiving element 121 and the second light receiving element 122 are also arranged in a direction corresponding to an up-down direction of the vehicle.

The vibration of the vehicle is dominated by a component in the up-down direction. Accordingly, the above-described inversion phenomenon of light reception is likely to occur between the first light receiving element 121 and the second light receiving element 122 arranged in the direction corresponding to the up-down direction of the vehicle. However, since the processor 22 can exchange the first data D1 and the second data D2 as described above, it is possible to effectively correct the influence of the inversion phenomenon in the light reception caused by the vibration of the vehicle.

Figure 4:
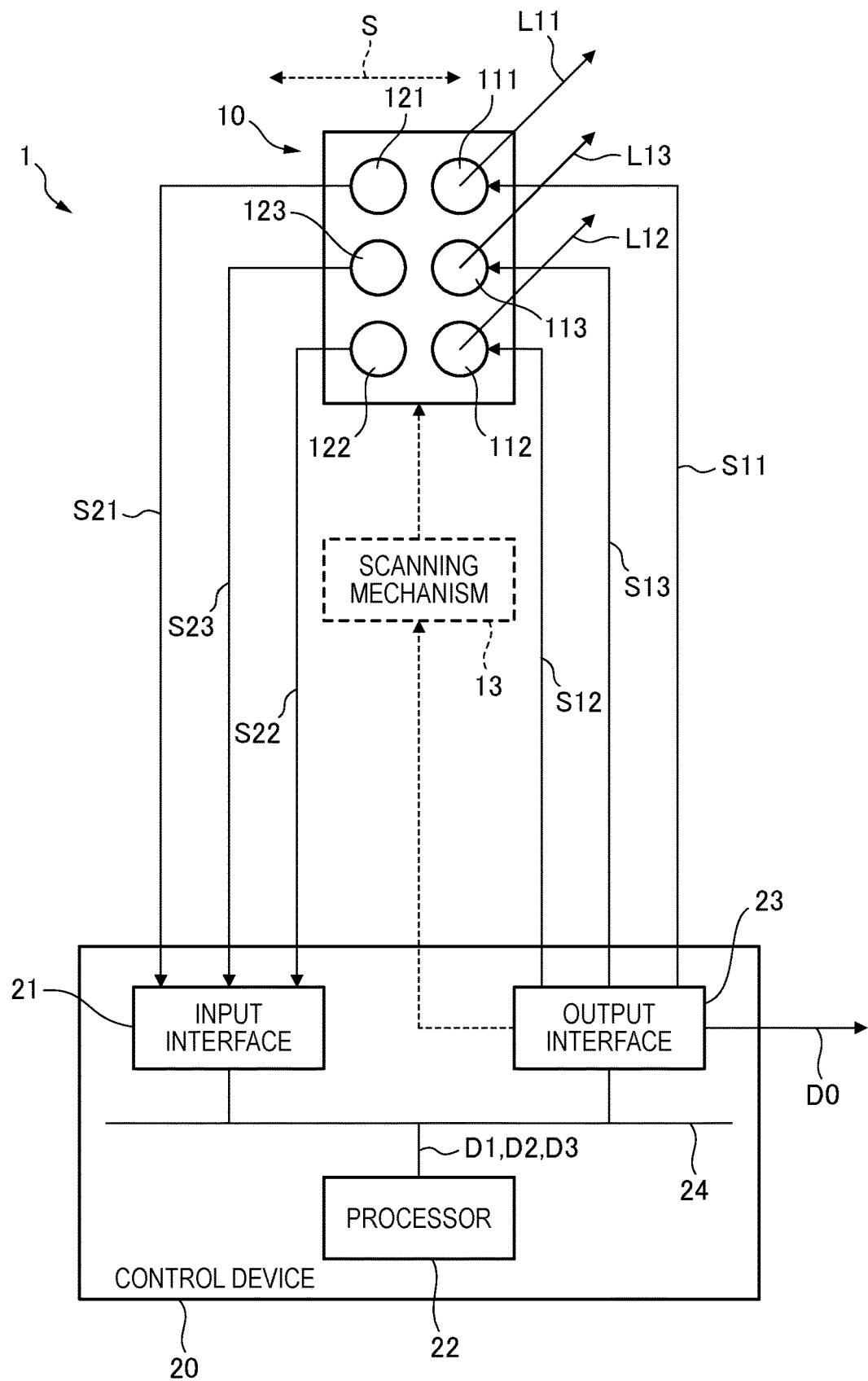
FIG. 4 illustrates another exemplary configuration of the sensor system of FIG. 1.

FIG. 4 illustrates another exemplary configuration of the sensor system 1. The LiDAR sensor unit 10 according to the present example further includes a third light emitting element 113 and a third light receiving element 123.

The third light emitting element 113 is disposed between the first light emitting element 111 and the second light emitting element 112. The third light emitting element 113 is configured to emit third detecting light L13 toward the outside of the vehicle. The third detecting light L13 is non-visible light. As the non-visible light, for example, infrared light having a wavelength of 905 nm can be used. As the third light emitting element 113, a semiconductor light emitting element such as a laser diode or a light emitting diode can be used.

The third light receiving element 123 is disposed between the first light receiving element 121 and the second light receiving element 122. The third light receiving element 123 is configured to output a light receiving signal S1 corresponding to the amount of incident light. The third light receiving signal S23 is an example of the third signal. The third light receiving element 123 has sensitivity to at least the wavelength of the third detecting light L13. As the third light receiving element 123, a photodiode, a phototransistor, a photo resistor, or the like can be used.

The third light receiving signal S23 outputted from the third light receiving element 123 is inputted to the input interface 21 of the control device 20. The processor 22 acquires the third data D3 corresponding to the third light receiving signal S23 inputted to the input interface 21. The third data D3 is placed in a state that can be subjected to information processing performed in the processor 22 (described later). That is, the input interface 21 has an appropriate circuit configuration for converting the third light receiving signal S23 into the third data D3.

The processor 22 inputs the third control signal S13 to the third light emitting element 113 via the output interface 23, thereby controlling the light emitting operation of the third light emitting element 113. Specifically, the amount of light, the light emission timing, the light emission cycle, and the like of the third detecting light L13 are controlled. By appropriately performing adjustment of the light emitting timing or light modulation, identification information can be assigned to the third detecting light L13.

Figure 5A:
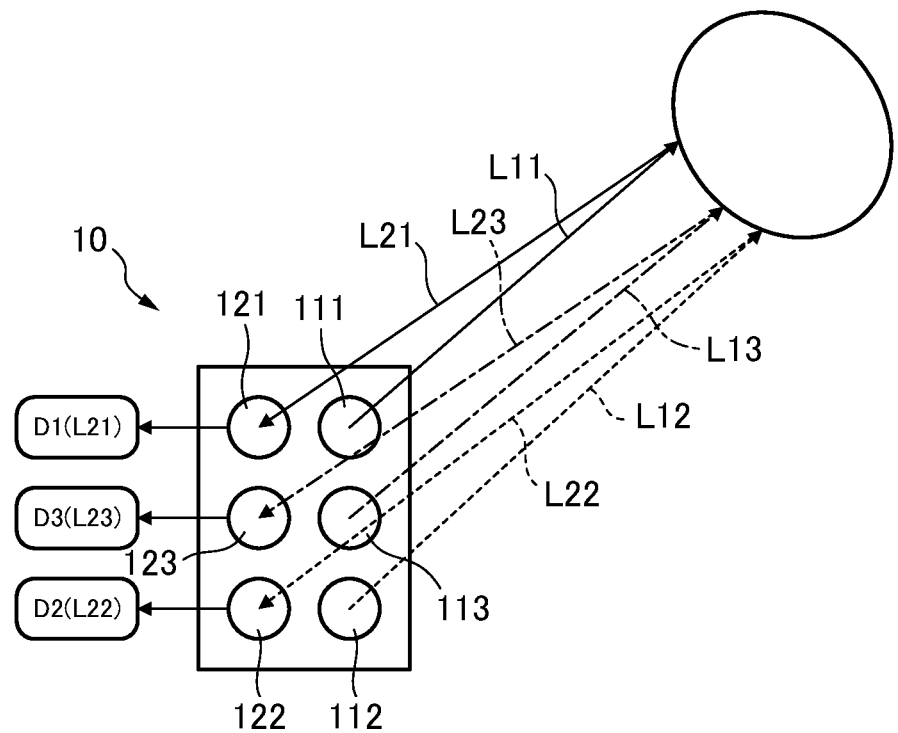
FIG. 5A is a diagram for explaining how the sensor system of FIG. 4 operates.

As illustrated in FIG. 5A, the third detecting light L13 emitted from the third light emitting element 113 is reflected by an object that situates outside the vehicle, so that third reflected light L23 is generated. The identification information assigned to the third detecting light L13 is reflected to the third reflected light L23. The third reflected light L23 is incident on the third light receiving element 123. The third light receiving element 123 outputs a third light receiving signal S23 corresponding to the amount of the third reflected light L23. As a result, the third data D3 associated with the third reflected light L23 is obtained. The identification information assigned to the third detecting light L13 is also reflected to the third data D3.

The processor 22 can obtain the distance to the object associated with the third reflected light L23 based on the time period from the time when the third detecting light L13 is emitted to the time when the third reflected light L23 is detected. Additionally or alternatively, the processor 22 can obtain information as to an attribute such as the material of the object associated with the third reflected light L23 based on the difference in waveforms of the third detecting light L13 and the third reflected light L23.

As illustrated in FIG. 4, the LiDAR sensor unit 10 may include a scanning mechanism 13. The scanning mechanism 13 changes the light emitting directions of the first detecting light L11, the second detecting light L12, and the third detecting light L3 along a direction S intersecting the arrangement direction of the first light emitting element 111, the second light emitting element 112, and the third light emitting element 113. The processor 22 can control the operation of the scanning mechanism 13 via the output interface 23.

N sets of first data D1, second data D2, and third data D3 are acquired by repeating the light emitting operation and the light receiving operation N times during a single scanning. For example, by acquiring the distance information to the object described above for the N sets of data, it is possible to acquire information as to the shape of the object associated with the first reflected light L21, the second reflected light L22, and the third reflected light L23.

The processor 22 is configured to output data DO including the information of the object that situates outside the vehicle acquired as described above via the output interface 23 to an external entity. The data DO is used for additional information processing performed by another processor.

The operations performed by the processor 22 according to the present example can also be described in the flowchart illustrated in FIG. 3. First, the processor 22 acquires the first data D1, the second data D2, and the third data D3 as described above (STEP1).

Subsequently, the processor 22 determines whether or not there is an inversion phenomenon of light reception (STEP2). The determination is made between the first data D1 and the third data D3, as well as between the third data D3 and the second data D2. For example, when it is determined that the first data D1 is based on the third detecting light L13 and the third data D3 is based on the first detecting light L11 (Y in STEP2), the first data D1 and the third data D3 are exchanged (STEP4).

In this example, when it is determined that no inversion phenomenon is occurred in the light reception (N in STEP2), it is determined whether or not an overlap phenomenon is occurred in the light reception (STEPS). Specifically, it is determined whether both the first data D1 and the third data D3 are based on the first detecting light L11 or the third detecting light L13. Similarly, it is determined whether both the third data D3 and the second data D2 are based on the third detecting light L13 or the second detecting light L12.

As described with reference to FIG. 5A, in the normal state, the first reflected light L21 generated by the first detecting light L11 is incident on the first light receiving element 121, the second reflected light L22 generated by the second detecting light L12 is incident on the second light receiving element 122, and the third reflected light L23 generated by the third detecting light L13 is incident on the third light receiving element 123. Accordingly, if the first data D1 is created on the basis of the first reflected light L21, the identification information assigned to the first detecting light L11 is reflected in the first data D1. If the second data D2 is created on the basis of the second reflected light L22, the identification information assigned to the second detecting light L12 is reflected in the second data D2. If the third data D3 is created on the basis of the third reflected light L23, the identification information assigned to the third detecting light L13 is reflected in the third data D3. The processor 22 makes the above-described determination through the detection of the identification information.

When it is determined that the first data D1 is based on the first detecting light L11, the second data D2 is based on the second detecting light L12, and the third data D3 is based on the third detecting light L13 (N in STEPS of FIG. 3), the first data D1, the second data D2, and the third data D3 are outputted as they are, as illustrated in FIG. 5A (STEP3 of FIG. 3). Thereafter, the processing returns to STEP1.

Figure 5B:
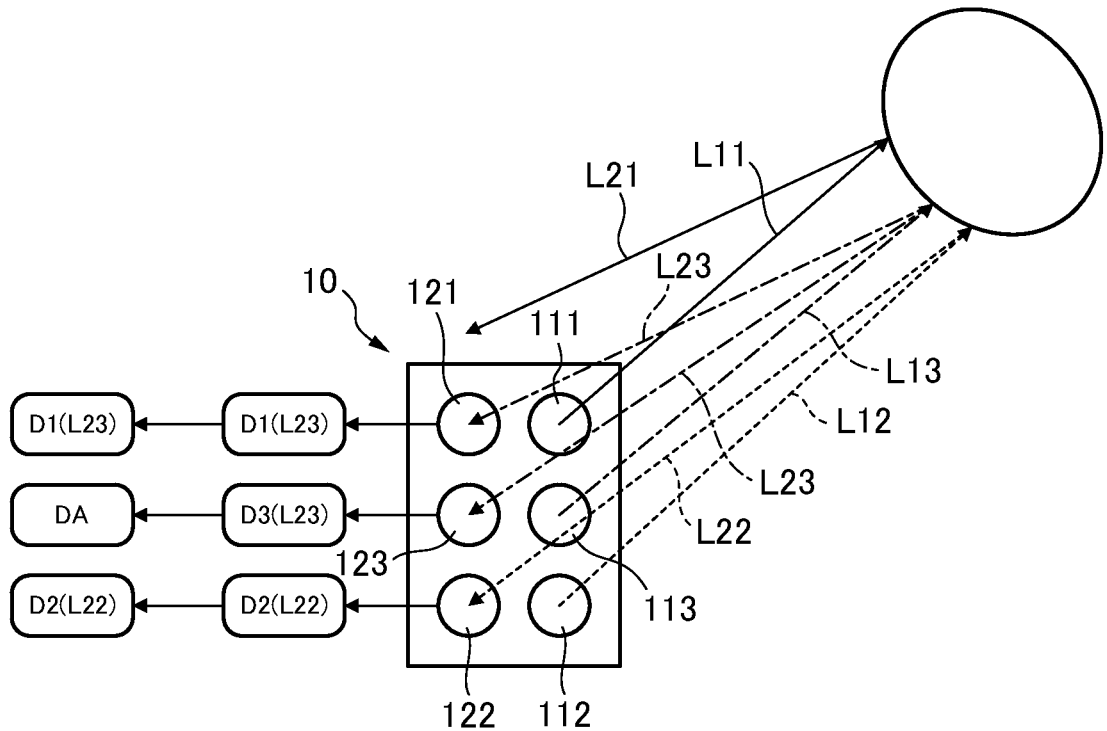
FIG. 5B is a diagram for explaining how the sensor system of FIG. 4 operates.

As illustrated in FIG. 5B, when the LiDAR sensor unit 10 is displaced due to vibration or the like of the vehicle, the third reflected light L23 may happen to be incident on both the first light receiving element 121 and the third light receiving element 123. In this case, the identification information assigned to the third detecting light L13 is reflected in the first data D1 created on the basis of the first light receiving signal S21 outputted from the first light receiving element 121. Similarly, the identification information assigned to the third detecting light L13 is also reflected in the third data D3 created on the basis of the third light receiving signal S23 outputted from the third light receiving element 123. When the first data D1 and the third data D3 are outputted as they are, the accuracy of the information as for the object in an outside area of the vehicle that is to be obtained by the subsequent processing is reduced.

Accordingly, when it is determined that both the first data D1 and the third data D3 are based on the first detecting light L11 or the third detecting light L13, or when it is determined that both the second data D2 and the third data D3 are based on the second detecting light L12 or the third detecting light L13 (Y in STEPS of FIG. 3), the processor 22 performs processing for replacing the third data D3 with average data DA, as illustrated in FIG. 5B (STEP6 of FIG. 3). The average data DA is created by averaging the first data D1 and the second data D2.

If only one set of the first data D1, the second data D2, and the third data D3 are acquired, the averaging processing is processing for calculating a simple average of the first data D1 and the second data D2. In a case where a plurality of sets of the first data D1, the second data D2, and the third data D3 are acquired by using the scanning mechanism 13, the averaging processing may be any of calculation of a simple average, calculation of a median value, and calculation of a mode value.

Subsequently, the replaced first data D1, the second data D2, and the average data DA are outputted (STEP3 of FIG. 3).

According to such a configuration, even when reflected light from an object is not normally incident on the light receiving element due to vibration or the like of the vehicle, it is possible to output data similar to the data that shall be obtained in the normal light receiving state. Accordingly, in a sensor system including at least three sets of light emitting elements and light receiving elements, it is possible to suppress degradation in information processing capability caused by vibration or the like of the vehicle.

In the present embodiment, the first light receiving element 121, the second light receiving element 122, and the third light receiving element 123 are arranged in a direction corresponding to the up-down direction of the vehicle.

The vibration of the vehicle is dominated by a component in the up-down direction. Accordingly, the above-described overlap phenomenon of light reception is likely to occur among the first light receiving element 121, the second light receiving element 122, and the third light receiving element 123 arranged in the direction corresponding to the up-down direction of the vehicle. However, since the processor 22 can perform the above-described averaging processing, it is possible to effectively correct the influence of the overlap phenomenon in the light reception caused by the vibration of the vehicle.

The functions of the processor 22 described later may be realized by a general-purpose microprocessor cooperating with a memory, or may be realized by a dedicated integrated circuit such as a microcontroller, an FPGA, and an ASIC.

The control device 20 may be disposed at any position in the vehicle. The control device 20 may be implemented by a main ECU configured to perform central control processing in the vehicle, or may be implemented by a sub ECU interposed between the main ECU and the LiDAR sensor unit 10.

The above embodiments are mere examples for facilitating understanding of the presently disclosed subject matter. The configuration according to the above embodiment can be appropriately modified without departing from the gist of the presently disclosed subject matter.

In the above embodiment, the first light emitting element 111 and the second light emitting element 112 are arranged in the direction corresponding to the up-down direction of the vehicle. The first light receiving element 121 and the second light receiving element 122 are also arranged in the direction corresponding to the up-down direction of the vehicle. However, the first light emitting element 111 and the second light emitting element 112 may be arranged in a direction corresponding to a left-right direction or a front-rear direction of the vehicle. The first light receiving element 121 and the second light receiving element 122 may also be arranged in the direction corresponding to the left-right direction or the front-rear direction of the vehicle. In this case, the light emitting directions of the first detecting light L11 and the second detecting light L12 can be changed by the scanning mechanism 13 in the direction corresponding to the up-down direction of the vehicle.

The LiDAR sensor unit 10 may be replaced with an appropriate sensor unit capable of detecting information in an outside area of the vehicle using a light emitting element and a light receiving element. Examples of such a sensor unit may include a TOF camera unit and a millimeter wave radar unit. A configuration using plural types of measurement techniques may be incorporated in a single sensor unit. The wavelength of the detecting light emitted by the light emitting element and the wavelength at which the light receiving element has sensitivity can be appropriately determined according to the detection technique to be used.

Figure 6:
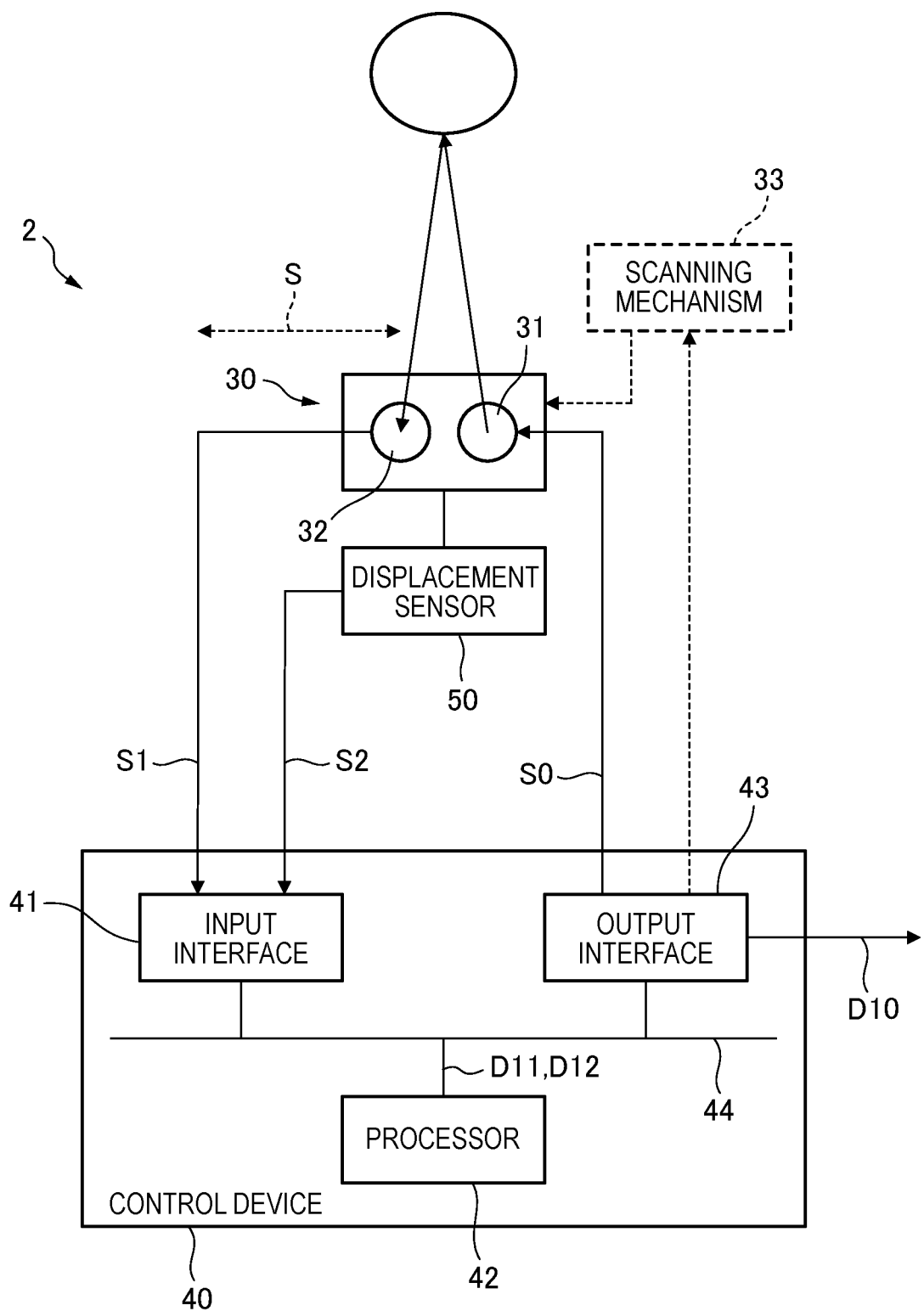
FIG. 6 illustrates a functional configuration of a sensor system according to a second embodiment.

FIG. 6 schematically illustrates a configuration of a sensor system 2 according to a second embodiment. The sensor system 2 is installed in a vehicle.

The sensor system 2 includes a LiDAR sensor unit 30. The LiDAR sensor 30 includes a light emitting element 31 and a light receiving element 32.

The light emitting element 31 is configured to emit detecting light L1 toward the outside of the vehicle. The detecting light L1 is non-visible light. As the non-visible light, for example, infrared light having a wavelength of 905 nm can be used. As the light emitting element 31, a semiconductor light emitting element such as a laser diode or a light emitting diode can be used.

The light receiving element 32 is configured to output a light receiving signal S1 corresponding to the amount of incident light. The light receiving element 32 has sensitivity to at least the wavelength of the detecting light L1. As the light receiving element 32, a photodiode, a phototransistor, a photo resistor, or the like can be used.

The sensor system 2 includes a control device 40. The control device 40 includes an input interface 41, a processor 42, an output interface 43, and a communication bus 44. The input interface 41, the processor 42, and the output interface 43 can exchange signals and data via the communication bus 44.

The light receiving signal S1 outputted from the light receiving element 32 is inputted to the input interface 41. The processor 42 acquires light receiving data D11 corresponding to the light reception signal S1 inputted to the input interface 41. The light receiving data D11 is placed in a state that can be subjected to information processing performed in the processor 42 (described later). That is, the input interface 41 has an appropriate circuit configuration for converting the light receiving signal S1 into the light receiving data D11.

The processor 42 inputs a control signal SO to the light emitting element 31 via the output interface 43, thereby controlling the light emitting operation of the light emitting element 31. Specifically, the amount of light, the light emission timing, the light emission cycle, and the like of the detecting light L1 are controlled.

The detecting light L1 emitted from the light emitting element 31 is reflected by an object that situates outside the vehicle, so that reflected light L2 is generated. The reflected light L2 is incident on the light receiving element 32. The light receiving element 32 outputs a light receiving signal S1 corresponding to the amount of light of the reflected light L2. As a result, the light receiving data D11 associated with the reflected light L2 is obtained. The light receiving data D11 is an example of data corresponding to information in an outside area of the vehicle.

The processor 42 can obtain the distance to the object associated with the reflected light L2 based on the time period from the time when the detecting light L1 is emitted to the time when the reflected light L2 is detected. Additionally or alternatively, the processor 130 can obtain information as to an attribute such as the material of the object associated with the reflected light L2 based on the difference in waveforms of the detecting light L1 and the reflected light L2.

The LiDAR sensor unit 30 may include a scanning mechanism 33. The scanning mechanism 33 changes the light emitting direction of the detecting light L1, for example, along a direction S intersecting the up-down direction of the vehicle. The processor 42 can control the operation of the scanning mechanism 33 via the output interface 43.

N first data D1 are acquired by repeating the light emitting operation and the light receiving operation N times during a single scanning. For example, by acquiring the distance information to the object described above for the N data sets, it is possible to acquire information as to the shape of the object associated with the reflected light L2.

The processor 42 is configured to output data D10 including the information of the object that situates outside the vehicle acquired as described above via the output interface 43 to an external entity. The data D10 is used for additional information processing performed by another processor.

The sensor system 2 includes a displacement sensor 50. The displacement sensor 50 is configured to detect the displacement of the LiDAR sensor unit 30. The displacement sensor 50 may be implemented by an acceleration sensor or a gyro sensor. The displacement sensor 50 is configured to output a displacement signal S2 corresponding to the detected LiDAR sensor unit 30.

The displacement signal S2 outputted from the displacement sensor 50 is inputted to the input interface 41 of the control device 40. The processor 42 acquires displacement data D12 corresponding to the displacement signal S2 inputted to the input interface 41. The displacement data D12 is placed in a state that can be subjected to information processing performed in the processor 42 (described later). That is, the input interface 41 has an appropriate circuit configuration for converting the displacement signal S2 into the displacement data D12.

Figure 7A:
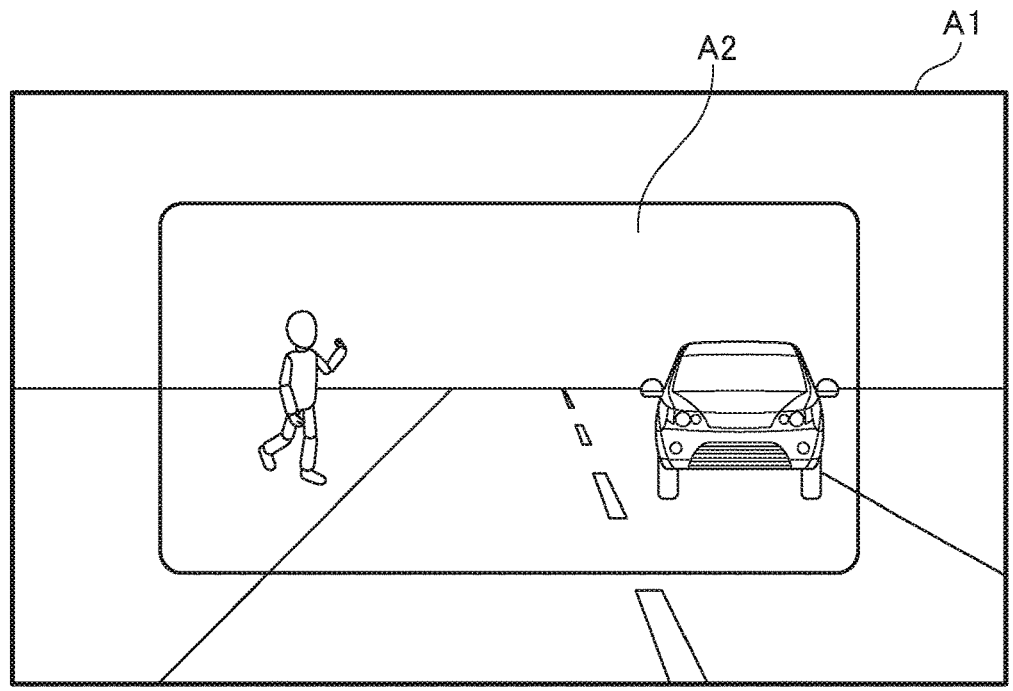
FIG. 7A is a diagram for explaining how the sensor system of FIG. 6 operates.

An area A1 illustrated in FIG. 7A illustrates an information detectable area of the LiDAR sensor unit 30. The area A2 represents an area including information outputted as the above-described data D10. The processor 42 extracts a portion corresponding to the area A2 from the acquired light receiving data D11 to create the data D10.

Figure 7B:
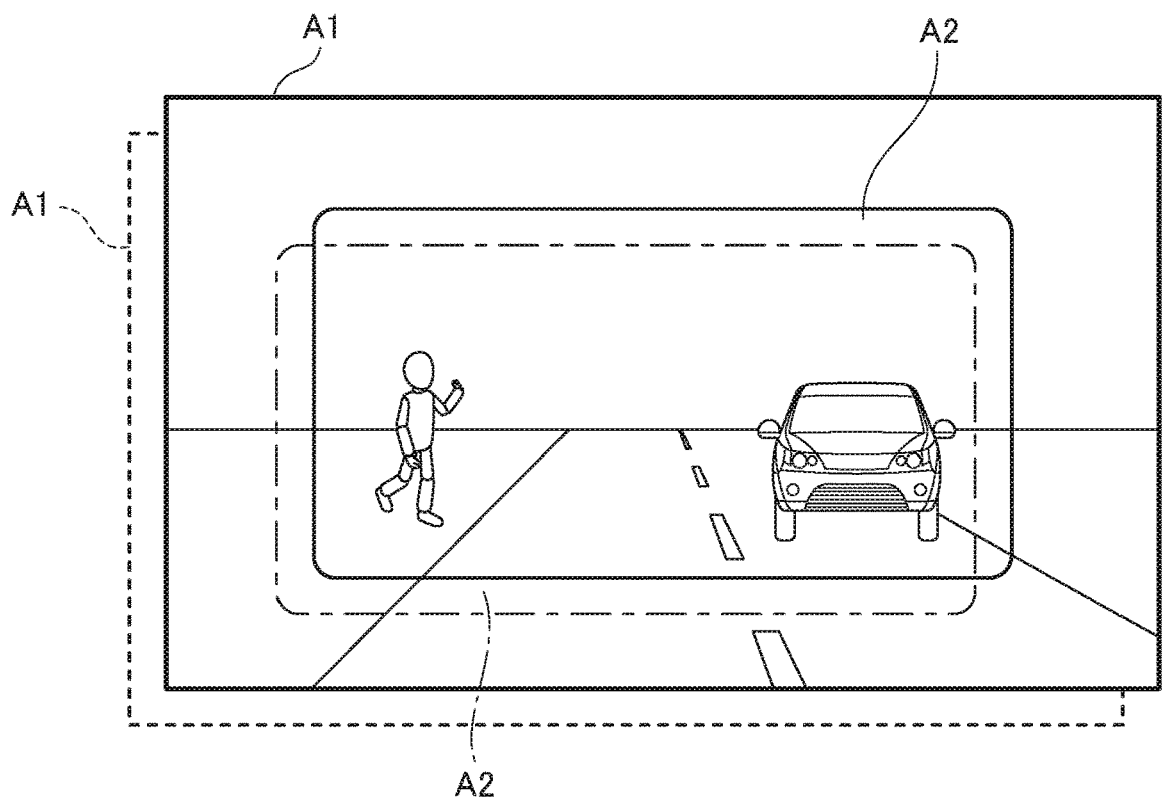
FIG. 7B is a diagram for explaining how the sensor system of FIG. 6 operates.

Due to vibration of the vehicle or the like, the LiDAR sensor unit 30 may be displaced from the initial position indicated by dashed lines. In the example illustrated in FIG. 7B, the LiDAR sensor unit 30 is displaced in the upper right direction, and the area A1 is also displaced in the upper right direction. As a result, the position of the object to be detected moves in the left-lower direction within the area A2. If no countermeasure is taken, there would be a case where information such as the distance to the object cannot be accurately obtained.

The displacement of the LiDAR sensor unit 30 is detected by the displacement sensor 50. Based on the displacement data D12 corresponding to the displacement, the processor 42 changes the area A2 to a position where the displacement of the LiDAR sensor unit 30 can be compensated for. In the example illustrated in FIG. 7B, the area A2 is moved from the initial position indicated by solid lines to the correction position indicated by chain lines. Such a changing processing is an example of correction of the light receiving data D11 based on the displacement data D12. The D10 is created from the light receiving data D11 corresponding to the area A2 the position of which has been changed in this manner, and outputted through the output interface 43.

According to the configuration as described above, it is possible to suppress the influence of the displacement of the LiDAR sensor unit 30 caused by the vibration or the like of the vehicle on the information detection. Accordingly, it is possible to suppress degradation in the information acquisition capability of the sensor system 2 caused by vibration or the like of the vehicle.

The functions of the processor 42 described later may be realized by a general-purpose microprocessor cooperating with a memory, or may be realized by a dedicated integrated circuit such as a microcontroller, an FPGA, and an ASIC.

The control device 40 may be disposed at any position in the vehicle. The control device 40 may be implemented by a main ECU configured to perform central control processing in the vehicle, or may be implemented by a sub ECU interposed between the main ECU and the LiDAR sensor unit 30.

The above embodiments are mere examples for facilitating understanding of the presently disclosed subject matter. The configuration according to the above embodiment can be appropriately modified without departing from the gist of the presently disclosed subject matter.

The displacement direction of the LiDAR sensor unit 30 detectable by the displacement sensor 50 is appropriately determined so as to include a pitch direction, a yaw direction, a roll direction, a horizontal shift direction, and a vertical shift direction. Since the vibration of the vehicle is dominated by a component in the up-down direction, it is preferable that the displacement sensor 50 is configured to be capable of detecting the displacement of the LiDAR sensor unit 30 at least along the up-down direction of the vehicle.

The LiDAR sensor unit 30 may be replaced with an appropriate sensor unit capable of detecting information in an outside area of the vehicle using a light emitting element and a light receiving element. Examples of such a sensor unit may include a TOF camera unit and a millimeter wave radar unit. A configuration using plural types of measurement techniques may be incorporated in a single sensor unit. The wavelength of the detecting light emitted by the light emitting element and the wavelength at which the light receiving element has sensitivity can be appropriately determined according to the detection technique to be used.

The invention claimed is:

1. A sensor system adapted to be installed in a vehicle, comprising:
   a first light emitting element configured to emit first detecting light with first identification information toward the outside of the vehicle;
   a second light emitting element configured to emit second detecting light with second identification information toward the outside of the vehicle;
   a first light receiving element configured to output a first signal corresponding to an amount of incident light;
   a second light receiving element configured to output a second signal corresponding to an amount of incident light; and
   a processor configured to acquire first data corresponding to the first signal and second data corresponding to the second signal, and configured to exchange the first data and the second data in a case where the first data includes information corresponding to the second identification information and the second data includes information corresponding to the first identification information.

2. The sensor system according to claim 1, comprising:
   a third light emitting element disposed between the first light emitting element and the second light emitting element, and configured to emit third detecting light toward the outside of the vehicle; and
   a third light receiving element disposed between the first light receiving element and the second light receiving element, and configured to output a third signal corresponding to an amount of incident light,
   wherein the processor is configured to acquire third data corresponding to the third signal, and configured to create average data by subjecting the first data and the second data to averaging processing to exchange the third data with the average data in a case where both of the first data and the third data are based on the first detecting light or the third detecting light, or a case where both of the second data and the third data are based on the second detecting light or the third detecting light.

3. The sensor system according to claim 1,
   wherein the first light receiving element and the second light receiving element are arranged in a direction corresponding to an up-down direction of the vehicle.

4. The sensor system according to claim 1,
   wherein the first light emitting element, the second light emitting element, the first light receiving element, and the second light receiving element constitute a part of at least one of a LiDAR sensor unit, a TOF camera unit, and a millimeter wave radar unit.

* * * * *